Patented Mar. 24, 1953

2,632,755

UNITED STATES PATENT OFFICE 2,632,755

PREPARATION OF SILICON-CONTAINING HETEROPOLYMERS

Raymond H. Bunnell, Toledo, Ohio, assignor to Libbey-Owens-Ford Glass Company, Toledo, Ohio, a corporation of Ohio No Drawing. Application October 2, 1947, Serial No. 777,602

28 Claims. (Cl. 260—46.5)

The invention relates to the preparation of silicon-containing heteropolymers and particularly to a novel heteropolymerization reaction and novel products resulting therefrom.

Copolymerization is the simultaneous polymerization of two or more substances to form molecules made up of units derived from both substances. Heteropolymerization is a special case of copolymerization; namely, the copolymerization of two unsaturated substances at least one of which does not readily polymerize alone.

In United States Patent No. 2,388,161 it is reported that tetra-allylsilane is a polymerizable substance, that it can be polymerized alone by the use of conventional polymerization procedures and that it can be copolymerized with a large variety of other polymerizable substances. Tetra-allylsilane, however, has the disadvantages that it is very expensive to produce and that its copolymerization with other polymerizable materials, because of the presence of so many allyl radicals in its molecule, causes excessive cross-linking which leads to severe shrinkage, brittleness and other difficulties.

The principal object of the invention is the preparation of new and improved silicon-containing heteropolymers and useful derivatives thereof. More specific objects and advantages are apparent from the description, which merely illustrates and discloses the invention and is not intended to impose limitations upon the claims.

It has been found that a silane whose molecule consists of a silicon atom connected to four monovalent radicals, at least one of which is an alkoxy radical, and at least one of which is a methallyl radical, is not a polymerizable substance. When heated with several per cent of its weight of benzoyl peroxide, such a silane shows no more tendency to polymerize than a silane containing saturated hydrocarbon radicals in place of the methallyl radicals.

An ester or anhydride of maleic acid or an ester of fumaric acid is a substantially unpolymerizable substance in that such an ester or anhydride can be polymerized alone with difficulty, if at all. The present invention is based upon the discovery that such an ester or anhydride polymerizes readily with a silane whose molecule consists of a silicon atom attached to four monovalent radicals, at least one of which is an alkoxy radical, and the remainder of which are hydrocarbon radicals including at least one methallyl radical. The polymerization of these two components is a true heteropolymerization because each of the two components is substantially unpolymerizable alone.

The present invention is extremely versatile in that the molecule of the silane may contain various alkoxy radicals and various saturated hydrocarbon radicals and in that the molecule of the ester may contain various alcohol radicals, so that it is possible to produce heteropolymers having widely varied properties fitting them for many different uses. If the silane contains more than one methallyl radical, or if the ester contains more than one polymerizable olefinic double bond, the polymerization is accompanied by cross-linking so that it produces an infusible, insoluble resin. The ester, if it contains more than one olefinic double bond, may be polymerizable alone. Polymerization of such an ester with a silane in accordance with the invention produces a new result, however, in that the silane actually copolymerizes with the ester so as to introduce silicon into the resin molecule, thereby imparting valuable new properties to the resin.

If in the practice of the invention a silane containing only one methallyl radical is polymerized with an ester containing only one olefinic double bond, the resulting heteropolymer ordinarily is fusible and may be a liquid. Such a heteropolymer has valuable properties that are due to the presence of alkoxy radicals in the heteropolymer molecules. The presence of these alkoxy radicals permits the carrying out of a further reaction in which the alkoxy radicals are hydrolyzed to hydroxy radicals which then are condensed with one another. The condensation of two hydroxy radicals on two different molecules produces an oxygen linkage and thereby cross-links the molecules to produce an infusible, insoluble resin. Thus the fusible heteropolymers of the present invention are valuable intermediates which by hydrolysis and condensation can be converted into infusible resins.

The practice of the invention requires the preparation of a polymerizable composition which comprises: (a) maleic anhydride, or a symmetrical or mixed ester of maleic or fumaric acid in which each of the alcohol radicals is allyl, methallyl, 1-chloro-2-propyl, 2-chloroethyl, benzyl, tetrahydrofurfuryl, cyclohexyl, phenyl, o-cresyl, m-cresyl, p-cresyl, methyl, ethyl, propyl, isopropyl, n-butyl, isobutyl, secondary butyl, or a primary or secondary alkyl radical having from five to eight carbon atoms; and (b) a silane having at least one methallyl radical and at least one alkoxy radical attached to the silicon atom. Such alkoxy radical may be methoxy, ethoxy, propoxy, isopropoxy, n-butoxy, isobutoxy, or secondary butoxy. The other two radicals in the silane molecule may be the same radical, or they may be two different radicals. The silane has one of the following general formulas

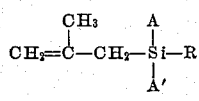 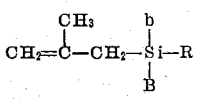

and

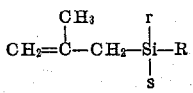

R is an alkoxy radical hereinbefore described.

A and A' may be the same or different and each is allyl, methallyl, benzyl, methyl, ethyl, propyl, isopropyl, n-butyl, isobutyl, secondary butyl, a primary or secondary alkyl radical having from five to eight carbon atoms, an alkoxy radical hereinbefore described, or a monovalent hydrocarbon radical of the benzene series having the free valence attached to the nucleus, having from six to twenty-one carbon atoms, and having not more than three side chains consisting of alkyl radicals of not more than five carbon atoms (i. e., a phenyl radical, or a mono-, di-, or tri-alkyl-substituted phenyl radical in which the alkyl radicals, if more than one, are the same or different, and each alkyl radical is methyl, ethyl, propyl, isopropyl, n-butyl, isobutyl, secondary butyl or tertiary butyl, or a primary, secondary or tertiary alkyl radical having five carbon atoms).

b is a monovalent cycloaliphatic hydrocarbon radical having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms (i. e., a cyclopentyl or cyclohexyl radical, or a mono- or di-alkyl-substituted cyclopentyl or cyclohexyl radical in which the alkyl radicals, if more than one, are the same or different, and are attached to different nuclear carbon atoms not more than one of which is adjacent the carbon atom attached to the free valence, and each alkyl radical is methyl, ethyl, propyl, isopropyl, n-butyl, isobutyl, secondary butyl, tertiary butyl, or a primary, secondary or tertiary alkyl radical having five carbon atoms).

B is an alkoxy radical hereinbefore described or a radical of the same class as b.

r is a monovalent hydrocarbon radical of the naphthalene series having the free valence attached to a nucleus, having from ten to twenty-five carbon atoms, and having not more than three side chains consisting of alkyl radicals of not more than five carbon atoms (i. e., a naphthyl radical that is unsubstituted, or is substituted with one, two or three similar or dissimilar alkyl radicals).

s is allyl, methallyl, or an alkoxy radical hereinbefore described.

Examples of esters with which the silanes may be polymerized include dimethyl maleate, diethyl maleate, diisopropyl maleate, di-n-propyl maleate, di-act-amyl maleate, diethyl fumarate, dipropyl fumarate, diisopropyl fumarate, diisobutyl fumarate, bis(beta-chloroethyl) fumarate, di-act-amyl fumarate, diphenyl fumarate, diphenyl maleate, dibenzyl fumarate, dibenzyl maleate, di-p-tolyl fumarate, diallyl maleate, diallyl fumarate, tetrahydrofurfuryl maleate and dimethallyl maleate. Other esters may be prepared by reacting maleic or fumaric acid, or maleic anhydride, with an alcohol by the usual methods of esterification, or by reacting the acid chloride with the alcohol. The alcohols which may be so reacted include methyl alcohol, ethyl alcohol, n-propyl alcohol, iso-propyl alcohol, n-butyl alcohol, ethylmethylcarbinol, n-amyl alcohol, n-hexyl alcohol, hexan-2-ol, n-hexyl carbinol, 4-heptanol, n-octanol, cyclohexanol, 1-chloro-2-propanol, 2-chloroethanol, allyl alcohol, methallyl alcohol, benzyl alcohol, tetrahydrofurfuryl alcohol, phenol, o-cresol, m-cresol and p-cresol.

The preferred polymerizable compositions comprise an ester of maleic or fumaric acid in which each of the alcohol radicals is methyl, ethyl, propyl, isopropyl, n-butyl, isobutyl, secondary butyl, or a primary or secondary alkyl radical having from five to eight carbon atoms, and a silane having one of the above general formulas in which A', B and s are alkoxy radicals hereinbefore described, or a silane having the general formula

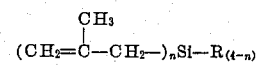

in which n is an integer from 1 to 3, and R is an alkoxy radical hereinbefore described. The preferred alkoxy radical is ethoxy.

Methallylalkoxysilanes are prepared by the procedure described in Example 1. Alkoxysilanes having one or two methallyl radicals attached to the silicon atom are reacted with a Grignard reagent to prepare further-substituted silanes, according to Equation 1, 2 or 3 (below).

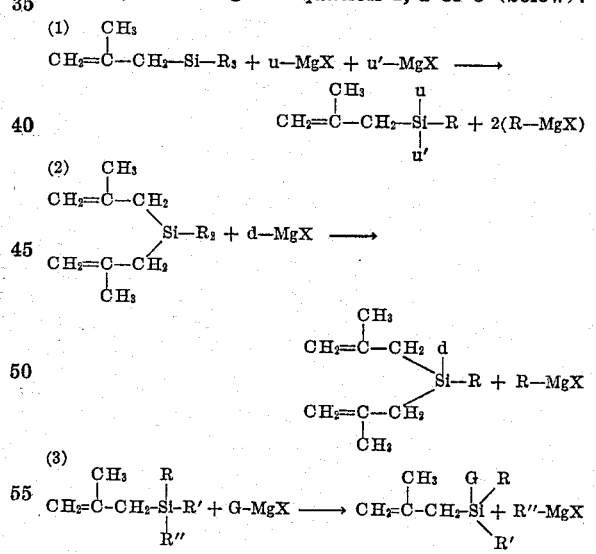

in which X is a chloro, bromo, or iodo radical; each of the radicals R, R' and R'' is an alkoxy radical hereinbefore described; R, R' and R'' may be the same or different; each of the radicals u and u' is of the class consisting of benzyl, alkyl radicals having from one to eight carbon atoms and having at least one hydrogen atom attached to the same carbon atom as the free valence, monovalent hydrocarbon radicals of the benzene series having the free valence attached to the nucleus, having from six to twenty-one carbon atoms, and having not more than three side chains consisting of alkyl radicals of not more than five carbon atoms, and monovalent cycloaliphatic hydrocarbon radicals having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms; d is of the class consisting of allyl, methallyl, benzyl, alkyl radicals having from one to eight carbon atoms and having at least one hydrogen atom attached to the same carbon atom as the free valence, monovalent aromatic hydrocarbon radicals having the free valence attached to a nucleus, having not more than two benzene nuclei that contain not more than ten carbon atoms, having from six to twenty-five carbon atoms, and having not more than three side chains consisting of alkyl radicals of not more than five carbon atoms; and G is of the class consisting of monovalent cycloaliphatic hydrocarbon radicals having a single nucleous containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms, and radicals of the same class as d.

The reaction is carried out under anhydrous conditions, preferably by slowly adding one halo-substituted hydrocarbon, G–X or d–X, or two halo-substituted hydrocarbons, u–X and u'–X, to allylalkoxysilane:

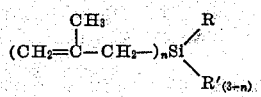

in which $n$ is an integer from 1 to 2. A hydrocarbon magnesium halide (Grignard reagent) is formed, which then reacts with the methallylalkoxysilane.

The halo-substituted hydrocarbons that may be used include allyl halides (allyl chloride, allyl bromide, and allyl iodide); methallyl halides (methallyl chloride, methallyl bromide and methalyl iodide), primary and secondary alkyl halides having from one to eight carbon atoms, such as methyl bromide, methyl chloride, methyl iodide, ethyl bromide, ethyl chloride, n-propyl bromide or chloride, isopropyl bromide or chloride, n-butyl bromide or chloride, secondary butyl bromide or chloride, isobutyl bromide or chloride, n-amyl bromide, isoamyl bromide, secondary amyl bromide, n-hexyl bromide, n-heptyl bromide, 3-bromoheptane, 4-bromoheptane, n-octyl bromide and 2-bromooctane; benzyl halides (benzyl chloride, benzyl bromide and benzyl iodide); halo derivatives of hydrocarbons of the benzene series, including bromobenzene, m-bromotoluene, p-bromotoluene, 4-bromo-o-xylene, 4-bromo-m-xylene, 5-bromo-m-xylene, 2-bromo-p-xylene, 3-bromopseudocumene, 5-bromopseudocumene, 6-bromopseudocumene, 2-bromomesitylene, 3-bromo-o-xylene, 2-bromo-1-ethyl benzene, 4-bromo-1-ethyl benzene, 4-bromo-1,3-diethyl benzene, 2-iodo-1,3,5-triethyl benzene, 6-bromo-3-ethyl toluene, 2-bromo-4-ethyl toluene, 4-bromo-1-propyl benzene, 4-bromo-isopropyl benzene, 4-bromo-1-methyl-3-isopropyl benzene, 6-bromo-1-methyl-3-isopropyl benzene, 2-bromo-p-cymene, 3-bromo-p-cymene, 4-bromo-1-butyl benzene, 4-bromo-1-tertiary butyl benzene, 4-bromo-1-isoamyl benzene and 4-bromo-1-tertiary amyl benzene; halo derivatives of hydrocarbons of the naphthalene series, including alpha-bromonaphthalene, beta-bromonaphthalene, 1-bromo-8-methyl naphthalene, 1-bromo-7-methyl naphthalene, 1-bromo-2-methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1-bromo-2,6-dimethyl naphthalene, 4-bromo-1,2-dimethyl naphthalene, 1-bromo-2,3-dimethyl naphthalene, 1-bromo-4-methyl naphthalene and 7-bromo-1-methyl naphthalene; and cycloaliphatic halides, such as bromocyclohexane, chlorocyclohexane, 2-methyl-1-bromocyclohexane, 2-methyl-1-chlorocyclohexane, 2-methyl-1-iodocyclohexane, 3-methyl-1-bromocyclohexane, 2-methyl-1-chlorocyclohexane, 3-methyl-1-iodo-cyclohexane, 4-methyl-1-bromocyclohexane, 4-methyl-1-chlorocyclohexane, 3,5-dimethyl-1-bromocyclohexane, 1-methyl-4-isopropyl-3-bromocyclohexane, 1-methyl-4-isopropyl-3-chlorocyclohexane, 4-n-propyl-1-bromocyclohexane, 3,4-diethyl-1-bromocyclohexane, 3-tertiary-butyl-1-chlorocyclohexane, bromocyclopentane, chlorocyclopentane, 3-ethyl-1-bromocyclopentane, and 3-isoamyl-1-bromocyclopentane.

In the formation of the Grignard reagent the theoretical reaction of one molecule of the halo-substituted hydrocarbon with each atom of magnesium is substantially complete, and it is preferable to use the halo-substituted hydrocarbon and magnesium in approximately the theoretical proportions since a substantial excess of either ingredient is unreacted. The magnesium used in the reaction is in a finely divided form, such as ribbon or turnings. The halo-substituted hydrocarbon and the methallylalkoxysilane used are those that yield the desired product. Since the reaction of magnesium with a chloro-substituted hydrocarbon does not "start" as readily as the reaction with a bromo-substituted hydrocarbon, it is usually necessary to initiate the reaction by the addition of a small amount (e. g., about 2 or 3 per cent of the magnesium) of a bromo-substituted hydrocarbon "starter," such as ethyl bromide or bromobenzene. (The terms "per cent" and "parts," as used herein to refer to quantities of material, mean per cent and parts by weight unless otherwise qualified.)

Although the Grignard reactions between a hydrocarbon magnesium halide and a methallylalkoxysilane represented by Equations 1, 2, and 3 (above) proceed whenever the reactants, in any molal ratio, are brought together under proper conditions, it is not economically practicable to prepare silanes represented by the general formula

or

or

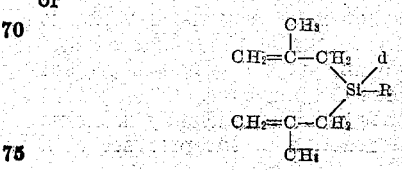

by using less than about ½ mol of a hydrocarbon magnesium halide per mol of a methallylalkoxysilane. It is not economically practicable to prepare a dialkoxysilane by using more than about 1½ mols of a hydrocarbon magnesium halide per mol of a methallyltrialkoxysilane. If it is desired to prepare a monoalkoxysilane, it is preferable to use at least about 1½ mols of a hydrocarbon magnesium halide per mol of a methallylalkoxysilane, but it is not economically practicable to use more than about 3½ mols of a hydrocarbon magnesium halide per mol of a methallylalkoxysilane. The minimum ratio of reactants is that below which a substantial yield of the desired product is not obtained, while the maximum ratio of reactants is that above which the yield of desired silanes (based on the amount of hydrocarbon magnesium halide used) decreases materially, for example, because of byproduct formation. In the preparation of a dialkoxysilane it is most economical to use the hydrocarbon magnesium halide and the methallyltrialkoxysilane in a molal ratio of about 1:1. In the preparation of a monoalkoxysilane it is most economical to use the hydrocarbon magnesium halide and the methallylalkoxysilane in a molal ratio of about 2:1 or 3:1. For example, when phenyl magnesium bromide (about 18 parts) is reacted with methallyltriethoxysilane (about 22 parts), in a molal ratio of about 1:1, the resulting product contains phenylmethallyldiethoxysilane (about 10 parts). When phenyl magnesium bromide (about 27 parts) is reacted with methallyltriethoxysilane (about 22 parts), in a molal ratio of about 1½:1, the resulting product contains phenylmethallyldiethoxysilane (about 7 parts) and diphenylmethallylethoxysilane (about 4 parts).

In the most desirable procedure, the magnesium is added to the flask, and dropwise addition of the halo-substituted hydrocarbon is begun as soon as the Grignard reaction has been initiated by means of the "starter," hereinbefore described. When the Grignard reaction is proceeding so as to be noticeably exothermic the methallylalkoxysilane and ether are added slowly through the reflux condenser. After addition of the methallylalkoxysilane and ether, dropwise addition of the halo-substituted hydrocarbon is continued at a rate sufficient to maintain moderate refluxing of the ether.

The reaction takes place readily at ordinary temperatures with noticeable formation of a grayish precipitate and with evolution of heat as soon as the reactants are brought together. Since the reaction is exothermic in nature and becomes extremely violent if the halo-substituted hydrocarbon is added too rapidly, it is usually desirable to keep the temperature of the reaction mixture down to about 40° C. (e. g., by means of an ice bath) so that the halo-substituted hydrocarbon may be added at a reasonable rate. The reaction may be carried out at comparatively high temperatures under pressure (e. g., in a bomb), but the maximum temperature at atmospheric pressure is the boiling point of the reaction mixture.

The reaction is carried out in the absence of moisture and oxygen since any water which is present causes hydrolysis of the reactants and the products, and any oxygen which is present may decompose the Grignard reagent by oxidation. On the other hand, it is usually desirable to carry out the reaction in the presence of a volatile solvent or diluent, such as (anhydrous) ether.

In the preferred procedure, employing ether, the reaction is carried out in a closed vessel equipped with cooling means, an agitator and a condenser. Such a reaction is carried out at the reflux temperature of the ether so that the maximum output of heat generated during the reaction may be removed (by way of the reflux condenser). The ether vapor over the reaction mixture serves as a "vapor seal" to exclude air (containing both moisture and oxygen) from the reaction. However, the presence of a great excess of ether may have a tendency to reduce the yield, and the amount of ether used is preferably that amount required to keep the reaction mixture in a highly fluid state (thereby avoiding points of concentrated reaction), for example, an amount of ether equal to about one-half the weight of the reaction mixture.

After the halo-substituted hydrocarbon is added the reaction mixture is refluxed for several hours in order to ensure complete reaction. To prepare certain silanes (e. g., alkyl- and cycloaliphatic-substituted silanes) it is necessary to distill the ether and heat the residue strongly for several hours. After the reaction is completed, the magnesium salts (in the form of a grayish precipitate) in the reaction mixture are removed (preferably by filtration), the filter cake is washed with ether or benzene, and the volatile substances in the reaction mixture, which include byproducts and diluents, are removed by distillation at atmospheric pressure. The silanes in the product are obtained readily in a substantially pure state by (vacuum) fractional distillation.

The mechanism by which the polymerization of these silanes with maleic anhydride and the esters proceeds is not entirely clear, but, apparently, addition polymerization is usually the dominant reaction. In most instances, the polymerization of a silane whose molecule contains only one methallyl radical with an ester whose molecule contains only one olefinic double bond results in a fusible heteropolymer. However, maleic anhydride and a methallylalkoxysilane polymerize with almost explosive violence as soon as the polymerization mixture is warmed, as on a steam bath, and yield a hard, infusible, and in some instances, glass-like heteropolymer. A possible cause of the formation of an infusible heteropolymer is a reaction between the anhydride linkage and the alkoxy radicals, to give a cross-linked molecule.

The polymerization of the ester or maleic anhydride with a silane having two or three methallyl radicals yields an infusible heteropolymer; likewise, the polymerization of a silane having only one methallyl radical with an ester having two or more polymerizable olefinic double bonds yields an infusible heteropolymer. There are sufficient double bonds in these starting materials so that cross linking through double bonds could cause the formation of infusible heteropolymers. In many instances, however, these polymerizations are stopped before an insoluble, infusible heteropolymer is formed, and a viscous liquid is isolated.

The addition polymerization is thought to take place by reaction between the double bonds and to result in a long-chain, virtually saturated molecule. Figure (a) shows a molecule of dimethyl maleate and a molecule of a silane and figure (b) shows the addition heteropolymer which would result from the polymerization of the molecules shown in figure (a).

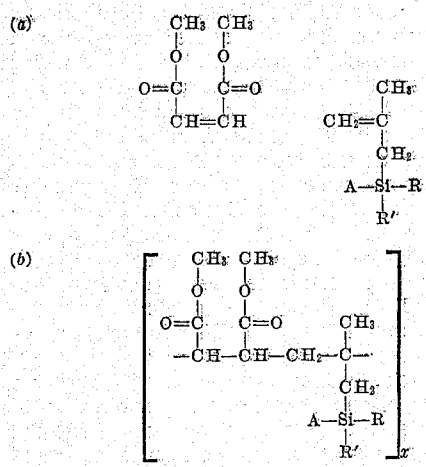

A, R and R' have the meanings hereinbefore described, and x is an integer of unknown magnitude. It is probable, of course, that the polymerization does not proceed with the regularity in the repeating unit indicated in figure (b).

The polymerization takes place when the silane and the anhydride or ester are brought together, in any ratio, with a catalyst, and is expedited by heating. The catalyst may be any organic peroxide, such as benzoyl peroxide, succinyl peroxide, acetyl peroxide, peracetic acid, perbenzoic acid, toluene peroxide, parabromobenzoyl peroxide, anisoyl peroxide, chloroacetyl peroxide, acetyl benzoyl peroxide, diacetyl peroxide, or furoyl peroxide, or any organic ozonide, such as diisopropyl ozonide, or diisobutylene ozonide or a mixture of such substances. The amount of catalyst used is ordinarily within the range from about 0.05 per cent of the reaction mixture (an amount at which polymerization proceeds at a rate that is at least appreciable, but not necessarily rapid enough for practical use) to about 5 per cent (an amount above which no appreciable increase in effect is observed). In most cases, the amount of catalyst that causes the reaction to proceed at the desired rate is from about 0.1 per cent to about 3 per cent.

In some instances it is desirable to carry out the polymerization in the presence of a solvent, such as methyl ethyl ketone or dioxane, because of the use of immiscible reactants (e. g., maleic anhydride and methallyltriethoxysilane).

The specific properties of any one heteropolymer can be varied widely by changing the ratio of reactants, so that the proportions of reactants used depend upon the end use of the heteropolymer. However, since the predominant reaction apparently is an addition polymerization, and neither component is polymerizable alone, it is advisable to react the silane with maleic anhydride or the ester in such proportions that there is about one methallyl radical, containing one olefinic double bond, per olefinic double bond in the maleic anhydride, or in the acid part of the ester molecule. Olefinic double bonds in the alcohol part of the ester molecule are not included in computing this ratio of reactants, although their presence has a material effect on the resulting product (e. g., diallyl maleate produces a very hard, tough, clear heteropolymer with dimethallyldiethoxysilane, whereas, under the same conditions, dimethyl maleate produces a weak, soft gel, or a rubbery gel).

The rate at which the polymerization proceeds depends upon the reactants used and the temperature. Some reactants polymerize more readily than others, and the polymerizations of maleic anhydride with the silanes are strongly exothermic, self-sustaining reactions, beginning almost as soon as the reactants are warmed. The temperature at which the polymerization is conducted is that which gives the desired degree of polymerization in a reasonable time (usually about 24 hours), and is usually between 50 and 75° C. for the polymerization of the esters with the silanes.

Although the difficulty of controlling the polymerization of a mixture of maleic anhydride with one of the silanes is an obstacle in many applications of the polymerized product, the speed of the polymerization of such a mixture suggests its use as a molding compound.

The characteristics of the polymerization reaction and of the resulting product depend upon the silane used (i. e., upon what two radicals, in addition to the alkoxy and methallyl radicals, are attached to the silicon atom in the silane molecule), the ester or acid anhydride used, the temperature at which polymerization proceeds, the time during which polymerization proceeds, and in some instances, the amount of catalyst. For example, maleic anhydride and methallyltriethoxysilane in a molal ratio of 1:1 with 1 per cent benzoyl peroxide polymerize in about ten minutes, to yield a thick syrup; maleic anhydride and dimethallyldiethoxysilane in a molal ratio of 2:1 with 1 per cent benzoyl peroxide, in an equal volume of dioxane, polymerize in about fifteen minutes, to yield a hard, colorless heteropolymer; maleic anhydride and n-butyl-methallyldiethoxysilane in a 1:1 molal ratio with 1 per cent benzoyl peroxide, and sufficient methyl ethyl ketone to give a one phase solution, polymerize in about thirty seconds, to yield a rubber-like heteropolymer, which sets to a hard, colorless solid after standing for several days. The polymerization of the saturated esters of maleic acid with the methallylethoxysilanes is slower than the polymerization of the corresponding fumaric acid esters with these silanes, and the products appear to have a lower molecular weight, and a greater tendency to remain fusible materials. The polymerization of maleic anhydride and methallyltriethoxysilane in a molal ratio of 1:1 with 5 per cent benzoyl peroxide proceeds with almost explosive violence, as soon as the reaction mixture is warm, to yield a hard, glass-like heteropolymer in from one to two minutes, while the polymerization of maleic anhydride with methallyltriethoxysilane in a 1:1 molal ratio with 1 per cent benzoyl peroxide, in an equal volume of dioxane, proceeds in about ten minutes to yield a thick syrup.

The viscosity of a given heteropolymer depends upon the temperature at which the polymerization proceeds, and upon the duration of the polymerization (e. g., the viscosity of a heteropolymer of methallyltriethoxysilane and diethyl fumarate, as determined by efflux time from a 25 ml. pipette, varies with polymerization time at 75° C. as follows: after 18 hours the efflux time is 143.0 seconds; after 24 hours the efflux time is 211.2 seconds and after 46 hours the efflux time is 259.7 seconds).

As at least one alkoxy radical is attached to each silicon atom in the polymer molecules, the polymerized compositions are hydrolyzable, at least in theory. Polymerized compositions having an extremely high molecular weight are insoluble in ordinary solvents, so that hydrolysis by the usual methods is impossible. However, when the polymerization product is of sufficiently low molecular weight so that it is a liquid or a soluble, fusible solid, hydrolysis after polymerization is possible.

The reactions of each alkoxy radical which theoretically occur during the course of hydrolysis and condensation are believed to correspond essentially to Equations 4 and 5 (below)

(4) 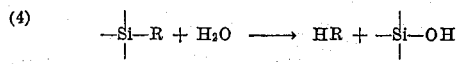

(5) 

in which R is an alkoxy radical.

The hydrolysis of a simple hydrolyzable silane (i. e., of a silane having only relatively simple radicals attached to the silicon atom, and having at least one hydrolyzable radical, such as a halo radical or a primary or secondary alkoxy radical) is likely to be a relatively vigorous exothermic reaction in the presence of an acid catalyst. The intermediate compound, which is known as a silanol (i. e., the product of a reaction corresponding to Equation 4), is known to exist and, in some instances, may be isolated (e. g., diethylsilanediol or diphenylsilanediol); however, such a compound usually condenses readily to a siloxane (i. e., the product of a reaction corresponding to Equation 5). In the usual hydrolysis reaction of such a simple silane the silanol which is produced is understood to exist in a transitory stage, and concurrently with or immediately after the production of the silanol, it is condensed to form the corresponding siloxane.

The general properties of a completely condensed siloxane (i. e., a siloxane substantially free of hydroxy radicals) prepared from a simple silane depend to a great extent upon the number and type of organic radicals attached to the silicon atoms. Logically, different hydrocarbon substituents impart highly different properties to the siloxane. On the other hand, the number of hydrolyzable groups in the silane that is hydrolyzed determines the number of cross linkages, believed to be Si—O—Si linkages, in the siloxane. It has been found, in general, that silanes containing three hydrolyzable groups in the molecule produce highly cross-linked, three dimensional, solid siloxanes; silanes containing two hydrolyzable groups produce cyclic and linear siloxanes; and silanes containing only one hydrolyzable group form disiloxanes containing only one Si—O—Si linkage in the molecule.

However, silanes which have been subjected to addition polymerization and, therefore, have large complicated radicals attached to the silicon atom, in addition to at least one hydrolyzable radical, condense to siloxanes relatively slowly, and, in many instances, a liquid hydrolysis product is isloated after hydrolysis.

The condensation products or siloxanes embodying the invention contain the characteristic linkage of different silicon atoms to an oxygen atom. Apparently the liquid hydrolysis products contain very few Si—O—Si linkages; because of the comparatively high molecular weight of the heteropolymers, relatively little cross-linking (through Si—O—Si bonds) would result in insoluble, infusible solids. The liquid products of the hydrolysis of the heteroploymers are condensed to hard infusible solids only under the action of heat.

The polymerized silanes are hydrolyzed by adding the silane to a hydrolyzing solution of an acid at room temperature, with agitation, and allowing the reaction to proceed for a short time. The hydrolysis product is recovered by extraction with a solvent such as ether and is washed with a reducing solution such as ferrous sulfate, and the solution of the extract is dried over sodium sulfate. An inhibitor, if used, is added to the dried solution of the extract. A solvent such as a simple ketone or ester, or one of the lower homologues of benzene, is added to the dried solution of the extract, and the extracting solvent is removed, as by heating on a steam bath.

Usually it is desirable to avoid gelling of the solution of the hydrolyzed heteropolymer. Unless precautions are taken, gelling is likely to occur during removal of the extracting solvent. Apparently, the presence of peroxides increases the tendency of the hydrolyzed heteroploymer to gel. It is, therefore, advantageous to destroy the peroxides, as by washing with a solution of a reducing agent, such as ferrous sulfate. An inhibitor such as hydroquinone or p-aminophenol may be added to the hydrolyzed silane, and will greatly decrease the tendency to gel. However, most inhibitors have a deleterious effect on the hydrolyzed heteropolymers, and it is preferable to avoid their use.

It has been found that the addition of certain solvents to the extraction solution makes it possible to remove the extracting solvent such as ether without gelling the hydrolyzed heteropolymer. Several of the lower homologues of benzene, such as benzene, toluene and the xylenes, give satisfactory results, but the simple ketones and esters are far more advantageous. Solutions of the hydrolyzed heteropolymers in hydrocarbon solvents have a tendency to gel upon standing; whereas, solutions in ketones are far more stable, and do not gel even after standing for several months. It is believed that the polar molecule of the hydrolyzed heteropolymer is considerably more soluble in the polar ketones and the polar esters than in the non-polar hydrocarbon solvents, and that there is probably some increase in the average molecular weight of the hydrolyzed heteropolymer upon standing, with a corresponding decrease in solubility. This increase in molecular weight is thought to be sufficient to make the hydrolyzed heteropolymer insoluble in the hydrocarbon solvents, so that a gel results. However, in the polar ketone or ester solvents, the hydrolyzed heteropolymer remains soluble even after the increase in molecular weight which accompanies several months' standing.

The viscosity of the polymerized silane before hydrolysis seems also to affect the tendency of the hydrolyzed heteropolymer to gel during and after evaporation of the extracting solvent; that is, hydrolysis of a viscous heteropolymer is more likely to yield a gel during or after evaporation of the extracting solvent than hydrolysis of a less viscous heteropolymer. The viscosity of the polymerized silane is controlled by regulating the temperature and the duration of the polymerization reaction, as hereinbefore described. However, the products of the hydrolysis of even the most viscous heteropolymers of the invention are recovered without gelling by washing the extraction solution with ferrous sulfate, and by adding a polar solvent, such as a simple ketone or ester, to the ether solution before evaporating the ether.

The hydrolysis reaction may be carried out by simply adding a polymerized silane to a hydrolyzing solution of an inorganic acid in water.

However, as most polymerized silanes are insoluble in such a hydrolyzing solution, violent agitation would be required to effect the hydrolysis. It is, therefore, usually preferable to carry out the hydrolysis in a mutual solvent (i. e., a solvent, such as dioxane, acetone, methyl ethyl ketone, methyl alcohol or ethyl alcohol, which is capable of maintaining a mutual solution of the water, the acid and the polymerized silane).

Any amount of hydrolyzing solution may be used from a slight excess over the minimum which is theoretically required to hydrolyze the polymerized silane (i. e., one molecule of water for every two alkoxy radicals) to the maximum amount which permits a one-phase system to be maintained. The preferred hydrolyzing solution is an aqueous mineral acid solution containing about 10 per cent of mineral acid; the amount of this hydrolyzing solution used is about 50 per cent of the polymerized silane. The amount of solvent used may be any amount from the minimum required to maintain a one-phase system to the maximum amount which is considered economically practicable. The amount of solvent is preferably an amount sufficient to make the volume of the one-phase system about twice the volume of the heteropolymer being hydrolyzed.

Any inorganic acid, such as hydrochloric, sulfuric or phosphoric, may be used in the hydrolyzing solution, although hydrochloric acid is usually employed. The acid functions as a catalyst for the hydrolysis reaction, and even a trace of acid causes hydrolysis to take place at a rate that is at least appreciable (but not necessarily rapid enough for practical use). The amount of acid used may range from a trace, which gives an appreciable effect, to the amount above which no appreciable increase in effect can be obtained (i. e., about 20 per cent of the polymerized silane). The speed of the hydrolysis reaction is determined essentially by the amount of acid present in the hydrolysis solution, but the preferred amount in a particular instance is determined also by other factors, such as the reactivity of the polymerized silane and the extent of polymerization (e. g., high polymers seem to have a greater tendency than low polymers to gel during hydrolysis).

The hydrolysis reaction usually takes place at ordinary temperatures, and is slightly exothermic. Hydrolysis seems to be complete within a few minutes, but an extended hydrolysis reaction seems to have no harmful effects on the product. Therefore, the time of the hydrolysis reaction seems not to be critical, and it is usually preferable, for economic reasons, to use only a comparatively short hydrolysis reaction (e. g., about five minutes).

Many practical applications of the hydrolyzed heteropolymers involve their use as solutions in solvents such as simple ketones or esters, or the lower homologues of benzene. It is, therefore, often possible to use the solution of the hydrolyzed polymer obtained after evaporation of the extracting solvent (e. g., as a coating resin).

In general, a partially condensed siloxane undergoes a change in physical properties when heated, becoming a more viscous liquid or a solid. Although a fully condensed siloxane is extremely resistant to further change due to heat alone, it may be further polymerized to some extent by contact with acidic agents or alkaline agents or with air. The mechanism of such polymerization is not completely understood, but it is known to take place through the interaction or redistribution of Si—O—Si linkages, or the formation of new Si—O—Si linkages. The heteropolymers that have been hydrolyzed and partially or fully condensed appear to undergo the same changes as other siloxanes. Since, in their use, the hydrolyzed heteropolymers are subjected to heat in the presence of air, the final product is the extremely stable product resulting from complete condensation and further polymerization in the presence of air.

*Example 1*

A Grignard reaction between a methallyl magnesium halide and an alkyl orthosilicate is used to produce a methallyltrialkoxysilane, a dimethallyldialkoxysilane, and a trimethylallylalkoxysilane, for example, the methylallylethoxysilanes, according to the following procedure: A charge of finely divided magnesium turnings (1008 grams) is put into a three-necked flask and the flask is then fitted with a dropping funnel, a mercury-sealed stirrer and a reflux condenser equipped with a calcium chloride tube. A "starter" consisting of a bromo-substituted hydrocarbon in an absolute ether solution (15 ml. of ethyl bromide in 25 ml. of ether) is added to the charge (to initiate a reaction) and the flask begins to get warm. An alkyl orthosilicate in an absolute ether solution (2080 grams of ethyl orthosilicate in 4500 ml. of ether) is added to the charge through the dropping funnel. A methallyl halide (3822 grams of methallyl chloride) is then added dropwise (with stirring) through the dropping funnel at a rate sufficiently slow to avoid violent boiling of the reaction mixture (over a period of 14 hours). During the addition of the methallyl halide the flask is packed in ice and the temperature of the charge remains at about 40° C. After the addition of the methallyl halide is completed the material in the flask is refluxed for two hours. The resulting slurry, which contains a large amount of grayish precipitate (magnesium salts), is cooled and filtered; the filter cake is washed with an amount of ether equal to two or three times the volume of the filtrate and the ether is added to the filtrate. The volatile materials (e. g., ether and bimethallyl are distilled through a glass helix packed column at atmospheric pressure by heating the filtrate to about 125° C. and the remainder of the filtrate is separated by distillation at 15 to 20 mm. Hg (i. e., at an absolute pressure equal to about 15 to 20 mm. of mercury) to obtain the unreacted alkyl orthosilicate, the methallylalkoxysilanes, intermediate cuts, and a small amount of heavy oil-like liquid bottoms. The total silane product recovered consists of 234 grams of methallyltriethoxysilane (B. P. 86° C. at 19 mm. Hg; $n_D^{20}$ 1.4140;

$$d\frac{20}{20}0.9065)$$

604 grams of dimethallyldiethoxysilane (B. P. 102° C. at 18 mm. Hg; $n_D^{20}$ 1.4410;

$$d\frac{20}{20}0.8905)$$

and 660 grams of trimethallylethoxysilane (B. P. 110–112° C. at 12 mm. Hg; $n_D^{20}$ 1.4675;

$$d\frac{20}{20}0.8795)$$

each of which is found to be in a pure state.

Physical contents by which a silane may be identified are the boiling point at reduced pressure (B. P.), the index of refraction at 20° C.

($n_D^{20}$), and the specific gravity, i. e., the density at 20° C. compared with that of water at 20° C.

$$\left(d\frac{20}{20}\right)$$

The proportion of each of the methallylalkoxysilanes in the product may be varied by varying the ratio of the reactants. A trimethallylalkoxysilane, in an appreciable proportion, does not result from the reaction of a methallyl magnesium halide and an alkyl orthosilicate in a molal ratio of less than about 3½:1. For example, when a molal ratio (of methallyl magnesium chloride to ethyl orthosilicate) of about 2:1 is used the product consists of about one part methallyltriethoxysilane to one part dimethallyldiethoxysilane, and when a molal ratio (of methallyl magnesium chloride to ethyl orthosilicate) within the range from about ½:1 to about 1:1 is used the product consists substantially of methallyltriethoxysilane.

The corresponding methoxy, propoxy, isopropoxy, n-butoxy, isobutoxy and secondary butoxy silanes are prepared by carrying out the procedures of the preceding paragraphs using methyl, propyl, isopropyl, n-butyl, isobutyl, or secondary butyl orthosilicate. Mixed esters of orthosilicic acid with methyl, ethyl, propyl, isopropyl, n-butyl, isobutyl, and secondary butyl alcohols may also be used, in which case mixed alkoxysilanes result.

A Grignard reaction between an alkyl magnesium halide and a methallylalkoxysilane then is used to produce an alkylmethallyldialkoxysilane, a dialkylmethallylalkoxysilane or a dimethallylalkylalkoxysilane, for example, n-butylmethallyldiethoxysilane, and di(n-butyl)methallylethoxysilane, according to the following procedure: A charge of finely divided magnesium turnings (72 grams) is put into a three-necked flask and the flask is then fitted with a dropping funnel, a mercury-sealed stirrer and a reflux condenser equipped with a calcium chloride tube. A "starter" consisting of a bromo-substituted hydrocarbon in an absolute ether solution (8 grams of n-butyl bromide in 25 ml. of ether) is added to the charge (to initiate a reaction) and the flask begins to get warm. Dropwise addition of an alkyl halide (403 grams of n-butyl bromide) is then started. Absolute ether (575 ml.) is added through the reflux condenser, and addition of the alkyl halide is continued at a rate sufficiently slow to avoid violent boiling of the reaction mixture. After the addition of the alkyl halide, which requires about six hours, a methallyltrialkoxysilane (218 grams of methallyltriethoxysilane) is added dropwise over a period of about one hour. The ether is then distilled from the mixture and the residue is heated strongly for eight hours. The solid cake of salts remaining in the flask is washed with benzene (about 1½ liters) and filtered. The filter cake is well washed with benzene which is added to the filtrate. The volatile materials such as benzene are distilled from the filtrate through a glass helix packed column at atmospheric pressure by heating the filtrate to about 125° C., and the remainder of the filtrate is separated by distillation at about 10 to 15 mm. Hg to obtain 76 grams of di(n-butyl)methallylethoxysilane (B. P. 118–119° C. at 13 mm. Hg; $n_D^{20}$ 1.4410;

$$d\frac{20}{20}0.8394)$$

and 23 grams of n-butylmethallyldiethoxysilane (B. P. 96–98° C. at 16 mm. Hg; $n_D^{20}$ 1.4270;

$$d\frac{20}{20}0.8731)$$

The proportions of the mono and dialkylsilanes in the product may be varied by varying the ratio of the reactants. Other alkyl halides may be used in the practice of the invention to produce the corresponding mono and dialkylmethallylalkoxysilanes. The alkyl radical may be methyl, ethyl, n-propyl, isopropyl, isobutyl, secondary butyl, or a primary or secondary alkyl radical having from five to eight carbon atoms.

Maleic anhydride and a silane having at least one methallyl radical and at least one alkoxy radical then are polymerized according to the following procedures:

A methallyltrialkoxysilane (21.8 grams of methallyltriethoxysilane) and an equimolecular amount of maleic anhydride (9.8 grams) are mixed and benzoyl peroxide (1.6 grams) is added. The mixture is heated on a steam bath. An almost explosive exothermic reaction occurs with the formation of a highly viscous material which continues to polymerize to a glass-like heteropolymer in from one to two minutes.

A methallyltrialkoxysilane (21.8 grams of methallyltriethoxysilane) is heated by itself on a steam bath with benzoyl peroxide (0.22 gram); no noticeable polymerization takes place in thirty minutes. An equimolecular amount of maleic anhydride (9.8 grams) is dissolved in twice its volume of dioxane and mixed with the methallyltrialkoxysilane. This mixture is polymerized to a thick syrup at a controllable rate by heating on a steam bath for about ten minutes. A sample of the dioxane solution of the heteropolymer forms a rubbery white solid when poured into a hydrolyzing solution (e. g., a 5 per cent water solution of hydrochloric acid). A film of the dioxane solution of the heteropolymer on a glass plate bakes to a hard, clear, colorless, somewhat brittle film in about thirty minutes at 120° C.

A dimethallyldialkoxysilane (23 grams of dimethallyldiethoxysilane) is mixed in a 1:2 molal ratio with maleic anhydride (19.6 grams) in dioxane (50 ml.). Benzoyl peroxide (0.43 gram) is added to the mixture which is heated on a steam bath. Polymerization proceeds rapidly and exothermally in about fifteen minutes to yield a hard, colorless heteropolymer which is insoluble in the usual organic solvents such as the ketones, aliphatic alcohols and the lower homologues of benzene.

An n-butylmethallyldialkoxysilane (23.2 grams of n-butylmethallyldiethoxysilane) and an equimolecular amount of maleic anhydride (9.8 grams) are mixed; sufficient methyl ethyl ketone (10 ml.) to form a one-phase solution is added, followed by benzoyl peroxide (0.33 gram). The mixture is warmed on a steam bath and very rapid exothermic polymerization takes place in less than one minute to yield a rubber-like heteropolymer which sets to a hard, colorless solid after standing for several days.

*Example 2*

A Grignard reaction between an allyl magnesium halide and a methallylalkoxysilane is used to produce an allylmethallylalkoxysilane, for example, allylmethallyldiethoxysilane, by a procedure that is the same as that described in the first paragraph of Example 1 except that the ingredients used are 48 grams of magnesium; 5 ml. of bromobenzene in 50 ml. of ether as the "starter"; 450 grams of methallyltriethoxysilane (in 750 ml. of ether) in place of ethyl orthosilicate; and 175 grams of allyl chloride instead of methallyl chloride. After the addition of the "starter" to the magnesium, the flask is heated and dropwise addition of the allyl chloride is started. The methallyltriethoxysilane and ether are then added through the reflux condenser. After the addition of the allyl chloride, which requires three hours, refluxing is continued for one and one-half hours. The resulting reaction mixture is cooled and filtered; the cake is washed with ether; and the filtrate is distilled to yield 76 grams of allylmethallyldiethoxysilane (B. P. 78° C. at 13 mm. Hg; $n_D^{20}$ 1.4370;

$$d\frac{20}{20} 0.8865)$$

A maleic acid ester and a silane having at least one alkoxy radical and at least one methallyl radical are polymerized according to the following procedures:

A dimethallyldialkoxysilane (14.4 grams of dimethallyldiethoxysilane) and an equimolecular amount of a dialkyl maleate (7.2 grams of dimethyl maleate) are mixed and benzoyl peroxide (0.22 gram) is added. This mixture is polymerized by heating in an electric oven for forty-eight hours at 57° C. The polymerization product is a weak, soft gel.

A dimethallyldialkoxysilane (14.4 grams of dimethallyldiethoxysilane) is mixed in a 1:2 molal ratio with a dialkyl maleate (14.4 grams of dimethyl maleate), and benzoyl peroxide (0.29 gram) is added. This mixture is polymerized by heating in an electric oven for forty-eight hours at 57° C. The polymerization product is a rubbery gel.

A dimethallyldialkoxysilane (28.8 grams of dimethallyldiethoxysilane) is mixed in a 1:2 molal ratio with diallyl maleate (39.2 grams), and benzoyl peroxide (0.68 gram) is added. This mixture is polymerized by heating in an electric oven for forty-eight hours at 75° C. The polymerization product is a semi-hard solid which becomes a very hard, tough, clear heteropolymer upon standing for several days at room temperature.

A methallyltrialkoxysilane (10.9 grams of methallyltriethoxysilane) and an equimolecular amount of a dialkyl maleate (10.0 grams of dipropyl maleate) are mixed and benzoyl peroxide (0.21 gram) is added. This mixture is polymerized by heating in an electric oven for forty-eight hours at 70° C. The polymerization product is a low viscosity oil.

A methallyltrialkoxysilane (10.9 grams of methallyltriethoxysilane) and an equimolecular amount of a dialkyl maleate (8.6 grams of diethyl maleate) are mixed and benzoyl peroxide (0.20 gram) is added. This mixture is polymerized by heating in an electric oven for forty-eight hours at 70° C. The polymerization product is a low viscosity oil.

An allylmethallyldialkoxysilane (10.7 grams of allylmethallyldiethoxysilane) is mixed in a 1:2 molal ratio with a dialkyl maleate (14.4 grams of dimethyl maleate) and benzoyl peroxide (0.25 gram) is added. This mixture is polymerized by heating in an electric oven for forty-eight hours at 70° C. The polymerization product is a low viscosity oil.

*Example 3*

A Grignard reaction between an aryl or alkaryl halide and a methallylalkoxysilane is used to produce an arylmethallylalkoxysilane, or an alkarylmethallylalkoxysilane, for example, phenylmethallyldiethoxysilane and diphenylmethallylethoxysilane, by a procedure that is the same as that described in the first paragraph of Example 1 except that the ingredients used are 72 grams of magnesium; 37 grams of bromobenzene and 25 ml. of ether, as the "starter"; 436 grams of methallyltriethoxysilane (in 775 ml. of ether); and 434 grams of bromobenzene. Dropwise addition of bromobenzene is started as soon as the flask begins to get warm, and the methallyltriethoxysilane and ether are then added through the reflux condenser. After all of the bromobenzene has been added, refluxing is continued for three hours. The resulting reaction mixture is cooled and filtered; the cake is washed with about one liter of dry benzene which is added to the filtrate; and the filtrate is distilled to yield 85 grams of diphenylmethallylethoxysilane (B. P. 180–185° C. at 17 mm. Hg; $n_D^{20}$ 1.5259) and 145 grams of phenylmethallyldiethoxysilane (B. P. 142–144° C. at 20–21 mm. Hg; $n_D^{20}$ 1.4840).

A cycloalkylmethallylalkoxysilane, for example, cyclohexylmethallyldiethoxysilane, is prepared by a procedure that is the same as that described in the first paragraph of Example 1 except that the ingredients are 24.3 grams of magnesium; 218 grams of methallyltriethoxysilane (in 480 ml. of ether) in place of ethyl orthosilicate; and 163 grams of cyclohexyl bromide instead of methallyl chloride. The magnesium is placed in the flask, and the Grignard reaction is initiated by adding 7 grams of the cyclohexyl bromide in 20 ml. of ether. The flask begins to get warm, and the methallyltriethoxysilane (in the ether solution) and 21 grams of the cyclohexyl bromide are added slowly to the magnesium, over a period of about fifteen minutes. After this addition has been made, the remainder of the cyclohexyl bromide is added dropwise, over a period of about three hours, and the resulting solution is refluxed for about one hour. The ether is distilled from the reaction mixture until the temperature has risen to about 125° C., and the reaction mixture is maintained at that temperature for about two to three hours, until the liquid becomes thick from salts. The ether is then reintroduced and the reaction mixture is refluxed for about four hours. The resulting reaction mixture is cooled and filtered; the cake is washed with benzene which is added to the filtrate; and the filtrate is separated to yield 68 grams of cyclohexylmethallyldiethoxysilane (B. P. 133° C. at 20 mm. Hg; $n_D^{20}$ 1.4560;

$$d\frac{20}{20} 0.9245)$$

A cyclopentylmethallylalkoxysilane, for example, cyclopentylmethallyldiethoxysilane, is prepared by carrying out a procedure that is the same as that described in the preceding paragraph except that the ingredients used are 24.3 grams of magnesium; 218 grams of methallyltriethoxysilane (in 295 ml. of ether); and 149 grams of cyclopentyl bromide. A "starter" consisting of 9 grams of the cyclopentyl bromide in 15 ml. of ether, is added to the magnesium in the flask. When the reaction has started the methallyltriethoxysilane and the ether are added to the magnesium; the remainder of the cyclopentyl bromide is added dropwise, over a period of about three hours; and the reaction mixture is held at about 70° C. for about one hour. The ether is distilled from the reaction mixture, which is then held at about 165° C. for about two hours. The resulting reaction mixture is cooled and filtered; the filter cake is washed with ether which is added to the filtrate; and the filtrate is separated to yield 52 grams of cyclopentylmethallyldiethoxysilane (B. P. 123–126° C. at 21 mm. Hg; $n_D^{20}$ 1.4460;

$$d\frac{20}{20}0.9205)$$

Alkyl - substituted cycloalkylmethallylalkoxysilanes, for example, 4-tertiary-amylcyclohexylmethallyldiethoxysilane, are prepared by carrying out a procedure that is the same as that described in the preceding paragraph except that the ingredients used are 33.6 grams of magnesium; 305.2 grams of methallyltriethoxysilane (in 80 ml. of ether); and 326.2 grams of 4-tertiary-amylcyclohexyl bromide. The "starter" consists of 6.2 grams of the 4-tertiary-amylcyclohexyl bromide in 20 ml. of ether. Dropwise addition of the 4-tertiary-amylcyclohexyl bromide requires about three and one-half hours. After the reaction mixture has been held at about 70° C. for one hour the ether is distilled, and the reaction mixture is held at about 135° C. for about four hours. The reaction mixture is cooled and filtered; the filter cake is washed with ether which is added to the filtrate; and the filtrate is separated to yield 130 grams of 4-tertiary-amylcyclohexylmethallyldiethoxysilane (B. P. 157–162° C. at 5 mm. Hg; $n_D^{20}$ 1.4639;

$$d\frac{20}{20}0.9195)$$

Other alkyl-substituted cycloaliphatic halides as hereinbefore described may be used in place of 4-tertiary-amylcyclohexyl bromide.

A benzylmethallyldialkoxysilane and a dibenzylmethallylalkoxysilane, for example, benzylmethallyldiethoxysilane and dibenzylmethallylethoxysilane, are prepared by a procedure that is the same as that described in the first paragraph of Example 1 except that the ingredients are 48 grams of magnesium, 253 grams of benzyl chloride, and 218 grams of methallyltriethoxysilane (in 975 ml. of ether). A "starter" consisting of 5 ml. of ethyl bromide in 25 ml. of ether is added to the magnesium in the flask. As soon as the reaction has started, dropwise addition of the benzyl chloride is begun, and the ether solution of methallyltriethoxysilane is added through the reflux condenser. Dropwise addition of the benzyl chloride is continued at a rate sufficient to maintain moderate refluxing of the ether. After the addition of benzyl chloride is completed, the reaction mixture is refluxed for about 24 hours, and the ether is then removed from the reaction mixture by distillation. Toluene (500 ml.) is added, and the resulting mixture is refluxed for about 6 hours. The reaction mixture is cooled and filtered; the cake is washed with toluene (500 ml.); the filtrate and washings are placed in a Claisen flask; and the toluene is distilled. Further precipitation accompanies distillation of the toluene. The reaction mixture is separated from the salts in the Claisen flask and is fractionated under reduced pressure to yield 50 grams of benzylmethallyldiethoxysilane (B. P. 106° C. at 4 mm. Hg; $n_D^{20}$ 1.4973;

$$d\frac{20}{20}0.9626)$$

and 15 grams of a yellow product (B. P. 140–150° C. at 3 mm. Hg) which consists substantially of dibenzylmethallylethoxysilane.

An ester of fumaric acid and a silane having at least one alkoxy radical and at least one methallyl radical are polymerized according to the following procedures:

A methallylalkoxysilane (2.2 grams of methallyltriethoxysilane) is mixed in a 1:1 molal ratio with a dialkyl fumarate (1.7 grams of diethyl fumarate), and benzoyl peroxide (0.04 gram) is added. This mixture is polymerized by heating in an electric oven for twenty-four hours at 75° C. The polymerization product is a thick, colorless syrup.

The procedure of the preceding paragraph is repeated using, as the methallylalkoxysilane: 1. phenylmethallyldiethoxysilane (2.5 grams); 2. n-butylmethallyldiethoxysilane (2.3 grams); or 3. diphenylmethallylethoxysilane (2.8 grams). In each case the polymerization product is a colorless syrup.

A dimethallyldialkoxysilane (22.8 grams of dimethallyldiethoxysilane) is mixed in a 1:2 molal ratio with a dialkyl fumarate (34.4 grams of diethyl fumarate), and benzoyl peroxide (0.57 gram) is added. This mixture is polymerized by heating in an electric oven for twenty-four hours at 75° C. The polymerization product is a rubbery, insoluble gel.

A methallyltrialkoxysilane (21.8 grams of methallyltriethoxysilane) is mixed in a 1:1 molal ratio with diallyl fumarate (19.6 grams), and benzoyl peroxide (0.41 gram) is added. This mixture is polymerized by heating in an electric oven for six hours at 75° C. The polymerization product is a soft gel.

A dimethallyldialkoxysilane (22.8 grams of dimethallyldiethoxysilane) is mixed in a 1:2 molal ratio with diallyl fumarate (39.2 grams), and benzoyl peroxide (0.62 gram) is added. This mixture is polymerized by heating in an electric oven for one hour at 75° C. The polymerization product is a hard, clear, colorless resin.

A dimethallyldialkoxysilane (11.4 grams of dimethallyldiethoxysilane) is mixed in a 1:2 molal ratio with di-(2-ethylhexyl) fumarate (34.0 grams), and benzoyl peroxide (0.45 gram) is added. This mixture is polymerized by heating in an electric oven for forty-eight hours at 70° C. The polymerization product is a high viscosity, colorless syrup.

An allylmethallyldialkoxysilane (10.7 grams of allylmethallyldiethoxysilane) is mixed in a 1:2 molal ratio with a dialkyl fumarate (17.2 grams of diethyl fumarate), and benzoyl peroxide (0.28 gram) is added. This mixture is polymerized by heating in an electric oven for forty-eight hours at 70° C. The polymerization product is part high viscosity, colorless syrup and part gel.

A benzylmethallyldialkoxysilane (13.2 grams of benzylmethallyldiethoxysilane) and an equimolecular amount of a dialkyl fumarate (8.6 grams of diethyl fumarate) are mixed and benzoyl peroxide (0.22 gram) is added. This mixture is polymerized by heating in an electric oven for forty-eight hours at 70° C. The polymerization product is a low viscosity oil.

A 4-tertiary-amylcyclohexylmethallyldialkoxysilane (32.6 grams of 4-tertiary-amylcyclohexylmethallyldiethoxysilane) and an equimolecular amount of a dialkyl fumarate (17.2 grams of diethyl fumarate) are mixed and benzoyl peroxide (0.50 gram) is added. This mixture is polymerized by heating in an electric oven for 60 hours at 70° C. The polymerization product is a viscous liquid. The viscous liquid is placed in a Claisen flask and distilled at 4 mm. Hg, the liquid being heated to 230° C. The distillate comprises about 6 grams of the monomers and about 6 grams of a material (having a boiling point of 129–130° C. at 4 mm. Hg) which solidifies at room temperature. Thus, the total distillate is about 12 grams, and the undistillable residue is about 31 grams.

A cyclopentylmethallyldialkoxysilane (24.2 grams of cyclopentylmethallyldiethoxysilane) and an equimolecular amount of a dialkyl fumarate (17.2 grams of diethyl fumarate) are mixed and benzoyl peroxide (0.41 gram) is added. This mixture is polymerized by heating in an electric oven for 60 hours at 70° C. The polymerized product is a viscous liquid.

A cyclohexylmethallyldialkoxysilane (25.6 grams of cyclohexylmethallyldiethoxysilane) and an equimolecular amount of a dialkyl fumarate (17.2 grams of diethyl fumarate) are mixed and benzoyl peroxide (0.43 gram) is added. This mixture is polymerized by heating in an electric oven for 60 hours at 70° C. The polymerization product is a viscous liquid. Benzoyl peroxide (0.86 gram) is added to this polymerization product, and the liquid is then placed in the electric oven for an additional 65 hours; no apparent increase in viscosity occurs.

*Example 4*

The fusible polymerized silanes of the invention may be hydrolyzed and condensed to siloxanes. This example demonstrates one of the difficulties (the tendency of the hydrolyzed heteropolymer to gel during its recovery from the hydrolysis solution) encountered in hydrolyzing the heteropolymers, and illustrates several ways of overcoming this difficulty.

A heteropolymer of methallyltriethoxysilane (185 grams) and diethyl fumarate (150 grams) is prepared, using benzoyl peroxide (3.35 grams), by heating in an electric oven for seventy-two hours at 75° C. The polymerization product, a colorless, viscous syrup, is hydrolyzed by dropping into a stirred mixture of a 7 per cent aqueous hydrochloric acid solution (200 ml.) and ethyl alcohol (200 ml.) at room temperature. After one hour of stirring, the resulting one-phase hydrolysis mixture is poured into a separatory funnel containing about an equal volume of water. The mixture in the separatory funnel is then shaken and extracted twice with ether (in 200 ml. portions). The ether extracts are combined and dried over anhydrous sodium sulfate, which is then separated by filtration, and the ether is removed by evaporation on a steam bath. Near the completion of the ether evaporation the viscous liquid gels; the gel is insoluble in toluene and xylene.

The following demonstrations illustrate ways of preparing hydrolyzed heteropolymers that avoid the gelling encountered in the procedure described in the preceding paragraph.

A mixture of methallyltriethoxysilane (116 grams) and diethyl fumarate (94 grams) is prepared, and benzoyl peroxide (2.10 grams) is added. This mixture is divided into three equal portions by volume which are placed in an electric oven at 75° C. to polymerize. Sample 1 is removed after eighteen hours; sample 2 is removed after twenty-four hours; and sample 3 is removed after forty-six hours. A test of the viscosity of each heteropolymer is made by measuring the time required for the heteropolymer to flow from a 25 ml. pipette at a temperature of 25° C. The efflux times are 143.0, 211.6 and 259.7 seconds for samples 1, 2 and 3, respectively.

Sample 1 is hydrolyzed by pouring it into a stirred mixture of a 7 per cent aqueous hydrochloric acid solution (35 ml.) and ethyl alcohol (35 ml.). The hydrolysis mixture is stirred vigorously for five minutes; ether (about 70 ml.) is added and the mixture is transferred to a separatory funnel. About an equal volume of water is added to the separatory funnel, the funnel is shaken, and the ether layer is then separated. The water solution is re-extracted with ether (about 70 ml.), and the combined ether extracts are dried over sodium sulfate. The sodium sulfate is removed by filtration, and evaporation of the ether is started on a steam bath. When most of the ether has evaporated, a toluene (50 ml.) is added, and the solution is further heated on a steam bath to evaporate the remaining ether. This procedure avoids gelling. A film of the resulting toluene solution of the heteropolymer dries tack-free in less than one hour at 140° C. The film is clear and hard but rather friable; baking for twelve hours at 140° C. causes crazing of the film. The toluene solution gels after standing about seventy-two hours.

Sample 2 is hydrolyzed by the procedure used to hydrolyze Sample 1. However, the toluene-ether solution of the hydrolyzed heteropolymer gels during evaporation of the ether.

Sample 3 is hydrolyzed by pouring it into a stirred mixture of a 7 per cent aqueous hydrochloric acid solution (35 ml.) and ethyl alcohol (35 ml.) The hydrolysis mixture is stirred vigorously for five minutes; ether (about 140 ml.) is added and the mixture is transferred to a separatory funnel. About an equal volume of water is added to the separatory funnel; the ether layer is separated, and washed twice with about 25 ml. of a 5 per cent aqueous ferrous sulfate solution. The ether extract is dried over sodium sulfate, and the sodium sulfate is removed by filtration. Hydroquinone (0.7 gram) is added to the ether solution, followed by toluene (50 ml.). The ether is evaporated gently on a steam bath. This procedure avoids gelling. A film of the toluene solution of the hydrolyzed heteropolymer remains tacky after extended heating at 140° C.

A mixture of methallyltriethoxysilane (87.2 grams), diethyl fumarate (68.2 grams) and benzoyl peroxide (1.6 grams) is polymerized by heating in an electric oven for twenty-four hours at 75° C. The viscosity is measured as described above; the efflux time at 25° C. is 179.0 seconds. The heteropolymer is hydrolyzed by pouring it into a stirred mixture of a 7 per cent aqueous hydrochloric acid solution (about 80 ml.) and ethyl alcohol (about 80 ml.). The hydrolysis mixture is stirred vigorously for five minutes; ether (about 300 ml.) is added and the mixture is transferred to a separatory funnel. About an equal volume of water is added to the separatory funnel; the ether layer is separated, and washed twice with about 25 ml. of a 5 per cent aqueous ferrous sulfate solution. The ether extract is dried over sodium sulfate, and the sodium sulfate is removed by filtration. Toluene (150 ml.) is added, and the ether is evaporated gently on a steam bath. This procedure avoids gelling. A film of the toluene solution of the hydrolyzed heteropolymer cures tack-free in about one hour at 140° C., but the film is soluble in acetone until it has cured about three hours at 140° C. The film is clear, hard and free of cracks.

A sample of the toluene solution of the hydrolyzed heteropolymer (about three parts) is diluted with acetone (about one part) to reduce the viscosity. The acetone-diluted solution is used to prepare a glass fiber laminate by dipping eight sheets of glass fiber cloth in the solution, suspending the sheets in air for about twenty minutes to allow drainage and solvent evaporation, and pressing the impregnated sheets of fiber glass between two glass plates (smeared with a commercial mold release fluid). The glass plates are subjected to pressure by clamps, and the laminate is placed in an electric oven for about fifteen hours at 140° C. The resulting laminate is hard and has good flexibility.

The remaining toluene solution forms a soft gel after standing for several days. This gel, however, is soluble in acetone, and the acetone solution remains stable for an extended period of time. A film of this acetone-toluene solution of the hydrolyzed heteropolymer cures completely in about three hours at 140° C. The resulting film is superior to one from the freshly prepared toluene solution of the hydrolyzed heteropolymer; no crazing or discoloration is observed after the film is heated for seventy-two hours at 145° C. The film appears to be unaffected by immersion for one hour in boiling water, and appears to be completely insoluble in acetone and hydrocarbon solvents.

A mixture of methallyltriethoxysilane (87.2 grams), diethyl fumarate (68.2 grams) and benzoyl peroxide (1.6 grams) is polymerized by heating in an electric oven for twenty-four hours at 75° C. The heteropolymer is hydrolyzed by pouring it into a stirred mixture of a 7 per cent aqueous hydrochloric acid solution (about 80 ml.) and ethyl alcohol (about 80 ml.). The hydrolysis mixture is stirred vigorously for five minutes; ether (about 300 ml.) is added and the mixture is transferred to a separatory funnel containing about an equal volume of water. The funnel is shaken; the ether layer is separated, and washed twice with about 25 ml. of a 5 per cent aqueous ferrous sulfate solution. The ether extract is dried over sodium sulfate, and the sodium sulfate is removed by filtration. Methyl ethyl ketone (about 300 ml.) is added, and the ether is evaporated gently on a steam bath. This procedure avoids gelling. A film of the methyl ethyl ketone solution of the hydrolyzed heteropolymer cures in about thirty minutes at 145° C. to a hard film, insoluble in acetone. The film apparently is unaffected by boiling water, or by three weeks' soaking in a 9 per cent aqueous hydrochloric acid solution. A 3 per cent aqueous KOH solution causes the film to crack and to peel from the plate in twelve hours. No crazing was observed in the film after seventy-two hours at 145° C.; however, cracking of the film was observed after seventy-two hours at 180° C.

*Example 5*

A mixture of phenylmethallyldiethoxysilane (25 grams), an equimolecular amount of diethyl fumarate (17.2 grams), and benzoyl peroxide (0.42 gram) is polymerized by heating in an electric oven for twenty-four hours at 75° C. The polymerization product, a viscous syrup, is hydrolyzed by pouring it into a stirred mixture of a 7 per cent aqueous hydrochloric acid solution (about 30 ml.) and ethyl alcohol (about 30 ml.) at room temperature. The resulting one-phase hydrolysis mixture is stirred for about five minutes and is then poured into a separatory funnel containing about an equal volume of water. The mixture in the separatory funnel is then shaken and extracted with ether (about 120 ml.). The ether solution is dried over anhydrous sodium sulfate, which is then separated by filtration, and the ether is removed by evaporation on a steam bath. When most of the ether has evaporated, toluene (25 ml.) is added, and the solution is further heated on a steam bath to evaporate the remaining ether. A film of the toluene solution of the hydrolyzed heteropolymer, when baked for seventy-two hours at 145° C., remains slightly thermoplastic at that temperature, but, upon cooling in the air, a hard brittle film results.

*Example 6*

A mixture of n-butylmethallyldiethoxysilane (5.8 grams), diethyl fumarate (4.3 grams) and benzoyl peroxide (0.1 gram) is polymerized by heating in an electric oven for twenty-four hours at 75° C. The polymerization product, a viscous syrup, is hydrolyzed by pouring it into a stirred mixture of a 7 per cent aqueous hydrochloric acid solution (about 10 ml.) and ethyl alcohol (about 10 ml.) at room temperature. The resulting one-phase hydrolysis mixture is stirred for about five minutes and is then poured into a separatory funnel containing about an equal volume of water. The mixture in the separatory funnel is then shaken and extracted with ether (about 40 ml.). The ether extract is dried over anhydrous sodium sulfate, which is separated by filtration. The evaporation of the ether is started on a steam bath; when most of the ether has evaporated, toluene (about 10 ml.) is added and the solution is further heated on a steam bath to evaporate the remaining ether. A film of the toluene solution of the hydrolyzed heteropolymer dries in three hours at 140° C. to a hard, clear, crack-free film.

Having described the invention, I claim:

1. A polymerizable composition comprising (1) a substance of the class consisting of maleic anhydride and esters of 1,2-ethylenedicarboxylic acids in which each of the alcohol radicals is of the class consisting of allyl, methallyl, 1-chloro-2-propyl, 2-chloro-ethyl, benzyl, tetrahydrofurfuryl, cyclohexyl, phenyl, cresyl, and alkyl radicals having from one to eight carbon atoms and having at least one hydrogen atom attached to the same carbon atom as the oxygen atom; and (2) a substance of the class consisting of those having the general formulas

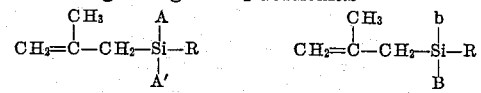

in which R is an alkoxy radical having from one to four carbon atoms and having at least one hydrogen atom attached to the same carbon atom as the oxygen atom; each of the radicals A and A' is of the class consisting of allyl, methallyl, benzyl, alkyl radicals having from one to eight carbon atoms and having at least one hydrogen atom attached to the same carbon atom as the free valence, monovalent aromatic hydrocarbon radicals having the free valence attached to a nucleus, having not more than two benzene nuclei that contain not more than ten carbon atoms, having from six to twenty-five carbon atoms, and having not more than three side chains consisting of alkyl radicals of not more than five carbon atoms, and radicals of the same class as R; b is a monovalent cycloaliphatic hydrocarbon radical having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms; and B is of the class consisting of radicals of the same class as b and R, the molar ratio of the first mentioned substance to the last mentioned substance being at least one and being not more than the number of methallyl radicals per molecule of the last mentioned substance.

2. A polymerizable composition as claimed in claim 1 in which the first-mentioned substance is an ester of a 1,2-ethylenedicarboxylic acid wherein each alcohol radical is an alkyl radical having from one to eight carbon atoms and having at least one hydrogen atom attached to the same carbon atom as the oxygen atom.

3. The product of the addition polymerization of a composition claimed in claim 1.

4. The product of the addition polymerization of a composition as claimed in claim 1 in which the first-mentioned substance is an ester of a 1,2-ethylenedicarboxylic acid wherein each alcohol radical is an alkyl radical having from one to eight carbon atoms and having at least one hydrogen atom attached to the same carbon atom as the oxygen atom.

5. A polymerizable composition as claimed in claim 1 in which the second-mentioned substance is one having the general formula

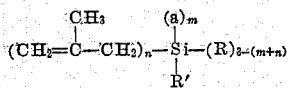

in which $n$ is an integer from 1 to 2 and the sum of $m$ and $n$ is from 1 to 2; each of the radicals R and R' is an alkoxy radical having from one to four carbon atoms and having at least one hydrogen atom attached to the same carbon atom as the oxygen atom; and $a$ is an alkyl radical having from one to eight carbon atoms and having at least one hydrogen atom attached to the same carbon atom as the free valence.

6. A polymerizable composition as claimed in claim 1 in which the second-mentioned substance is one having the general formula

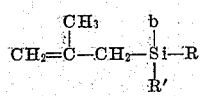

in which each of the radicals R and R' is an alkoxy radical having from one to four carbon atoms and having at least one hydrogen atom attached to the same carbon atom as the oxygen atom; and b is a monovalent cycloaliphatic hydrocarbon radical having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms.

7. A polymerizable composition as claimed in claim 1 in which the second-mentioned substance is one having the general formula

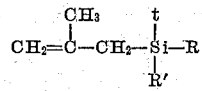

in which each of the radicals R and R' is an alkoxy radical having from one to four carbon atoms and having at least one hydrogen atom attached to the same carbon atom as the oxygen atom; and t is a monovalent aromatic hydrocarbon radical having the free valence attached to a nucleus, having not more than two benzene nuclei that contain not more than ten carbon atoms, having from six to twenty-five carbon atoms, and having not more than three side chains consisting of alkyl radicals of not more than five carbon atoms.

8. The product of the addition polymerization of a composition as claimed in claim 1 in which the second-mentioned substance is one having the general formula

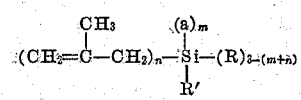

in which $n$ is an integer from 1 to 2 and the sum of $m$ and $n$ is from 1 to 2; each of the radicals R and R' is an alkoxy radical having from one to four carbon atoms and having at least one hydrogen atom attached to the same carbon atom as the oxygen atom; and a is an alkyl radical having from one to eight carbon atoms and having at least one hydrogen atom attached to the same carbon atom as the free valence.

9. The product of the addition polymerization of a composition as claimed in claim 1 in which the second-mentioned substance is one having the general formula

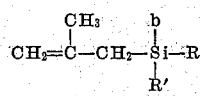

in which each of the radicals R and R' is an alkoxy radical having from one to four carbon atoms and having at least one hydrogen atom attached to the same carbon atom as the oxygen atom; and b is a monovalent cycloaliphatic hydrocarbon radical having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms.

10. The product of the addition polymerization of a composition as claimed in claim 1 in which the second-mentioned substance is one having the general formula

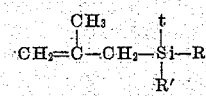

in which each of the radicals R and R' is an alkoxy radical having from one to four carbon atoms and having at least one hydrogen atom attached to the same carbon atom as the oxygen atom; and t is a monovalent aromatic hydrocarbon radical having the free valence attached to a nucleus, having not more than two benzene nuclei that contain not more than ten carbon atoms, having from six to twenty-five carbon atoms, and having not more than three side chains consisting of alkyl radicals of not more than five carbon atoms.

11. A polymerizable composition comprising a substance which is an ester of a 1,2-ethylenedicarboxylic acid wherein each alcohol radical is an alkyl radical having from one to eight carbon atoms and having at least one hydrogen atom attached to the same carbon atom as the oxygen atom; and a substance having the general formula

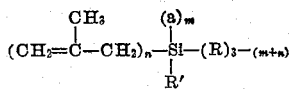

in which $n$ is an integer from 1 to 2 and the sum of $m$ and $n$ is from 1 to 2; each of the radicals R and R' is an alkoxy radical having from one to four carbon atoms and having at least one hydrogen atom attached to the same carbon atom as the oxygen atom; and a is an alkyl radical having from one to eight carbon atoms and having at least one hydrogen atom attached to the same carbon atom as the free valence, the molar ratio of the first mentioned substance to the last mentioned substance being at least one and being not more than the number of methallyl radicals per molecule of the last mentioned substance.

12. A polymerizable composition as claimed in claim 11 in which $n$ is 1.

13. The product of the addition polymerization of a composition claimed in claim 11.

14. The product of the addition polymerization of a composition as claimed in claim 11 in which $n$ is 1.

15. The product of the hydrolysis and condensation of the addition polymerization product claimed in claim 14.

16. A polymerizable composition comprising a substance which is an ester of a 1,2-ethylenedicarboxylic acid wherein each alcohol radical is an alkyl radical having from one to eight carbon atoms and having at least one hydrogen atom attached to the same carbon atom as the oxygen atom; and a substance having the general formula

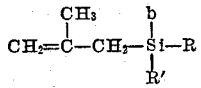

in which each of the radicals R and R' is an alkoxy radical having from one to four carbon atoms and having at least one hydrogen atom attached to the same carbon atom as the oxygen atom; and b is a monovalent cycloaliphatic hydrocarbon radical having a single nucleus containing from five to six carbon atoms one of which is connected to the free valence and to a hydrogen atom, another of which, adjacent the first, is connected to two hydrogen atoms, and the rest of which are each connected to at least one hydrogen atom, having from five to sixteen carbon atoms, and having not more than two side chains consisting of alkyl radicals of not more than five carbon atoms, the molar ratio of the first mentioned substance to the last mentioned substance being at least one and being not more than the number of methallyl radicals per molecule of the last mentioned substance.

17. The product of the addition polymerization of a composition claimed in claim 16.

18. The product of the hydrolysis and condensation of a product of the addition polymerization of a composition claimed in claim 16.

19. A polymerizable composition comprising a substance which is an ester of a 1,2-ethylenedicarboxylic acid wherein each alcohol radical is an alkyl radical having from one to eight carbon atoms and having at least one hydrogen atom attached to the same carbon atom as the oxygen atom; and a substance having the general formula

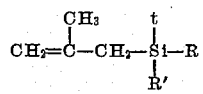

in which each of the radicals R and R' is an alkoxy radical having from one to four carbon atoms and having at least one hydrogen atom attached to the same carbon atom as the oxygen atom; and t is a monovalent aromatic hydrocarbon radical having the free valence attached to a nucleus, having not more than two benzene nuclei that contain not more than ten carbon atoms, having from six to twenty-five carbon atoms, and having not more than three side chains consisting of alkyl radicals of not more than five carbon atoms, the molar ratio of the first mentioned substance to the last mentioned substance being at least one and being not more than the number of methallyl radicals per molecule of the last mentioned substance.

20. The product of the addition polymerization of a composition claimed in claim 19.

21. The product of the hydrolysis and condensation of a product of the addition polymerization of a composition claimed in claim 19.

22. A polymerizable composition comprising a substance of the class consisting of maleic anhydride, and esters of 1,2-ethylenedicarboxylic acids in which each of the alcohol radicals is of the class consisting of allyl, methallyl, 1-chloro-2-propyl, 2-chloroethyl, benzyl, tetrahydrofurfuryl, cyclohexyl, phenyl, cresyl, and alkyl radicals having from one to eight carbon atoms and having at least one hydrogen atom attached to the same carbon atom as the oxygen atom; and a substance having the general formula

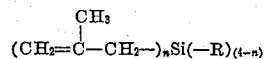

in which $n$ is an integer from 1 to 3, and R is an alkoxy radical having from one to four carbon atoms and having at least one hydrogen atom attached to the same carbon atom as the oxygen atom, the molar ratio of the first mentioned substance to the last mentioned substance being at least one and being not more than the number of methallyl radicals per molecule of the last mentioned substance.

23. A polymerizable composition as claimed in claim 22 in which the first-mentioned substance is an ester of a 1,2-ethylenedicarboxylic acid wherein each alcohol radical is an alkyl radical having from one to eight carbon atoms and having at least one hydrogen atom attached to the same carbon atom as the oxygen atom.

24. A polymerizable composition as claimed in claim 22 in which the last-mentioned substance has the general formula

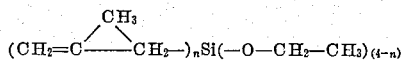

in which $n$ is an integer from 1 to 3.

25. The product of the addition polymerization of a composition claimed in claim 22.

26. The product of the addition polymerization of a composition as claimed in claim 22 in which the first-mentioned substance is an ester of a 1,2-ethylenedicarboxylic acid wherein each alcohol radical is an alkyl radical having from one to eight carbon atoms and having at least one hydrogen atom attached to the same carbon atom as the oxygen atom.

27. The product of the addition polymerization of a composition as claimed in claim 22 in which the last-mentioned substance has the general formula

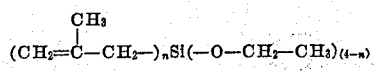

in which $n$ is a number from 1 to 3.

28. A copolymer of (1) an ester of a 1,2-ethylenedicarboxylic acid wherein each alcohol radical is an alkyl radical having from one to eight carbon atoms and having at least one hydrogen atom attached to the same carbon atom as the oxygen atom; and (2) a substance having the general formula

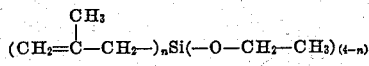

in which $n$ is an integer from 1 to 3, the molar ratio of the first mentioned substance to the last mentioned substance being at least one and being not more than the number of methallyl radicals per molecule of the last mentioned substance.

RAYMOND H. BUNNELL.

REFERENCES CITED

The following references are of record in the file of this patent:

UNITED STATES PATENTS

| Number | Name | Date |
|---|---|---|
| 1,945,307 | Dykstra | Jan. 30, 1934 |
| 2,377,689 | Hyde | June 5, 1945 |
| 2,388,161 | Kropa | Oct. 30, 1945 |
| 2,413,582 | Rust et al. | Dec. 31, 1946 |
| 2,420,912 | Hurd | May 20, 1947 |
| 2,443,740 | Kropa | June 22, 1948 |
| 2,450,594 | Hyde | Oct. 5, 1948 |
| 2,465,731 | Kropa | Mar. 29, 1949 |
| 2,502,286 | Sowa | Mar. 28, 1950 |
| 2,532,583 | Tyran | Dec. 5, 1950 |

FOREIGN PATENTS

| Number | Country | Date |
|---|---|---|
| 624,361 | Great Britain | June 7, 1949 |